United States Patent [19]

Geissbühler

[11] 4,379,356
[45] Apr. 12, 1983

[54] METHOD AND APPARATUS FOR PRODUCING SKINLESS SAUSAGES

[75] Inventor: Hans Geissbühler, Zuzwil, Switzerland

[73] Assignee: C. Hoegger & Cie, A.G., Gossau, Switzerland

[21] Appl. No.: 206,360

[22] Filed: Nov. 13, 1980

[30] Foreign Application Priority Data

Nov. 21, 1979 [CH] Switzerland ............... 10391/79

[51] Int. Cl.³ .................................. A22C 11/00
[52] U.S. Cl. .............................. 17/45; 17/1 F; 17/32; 426/513; 426/523
[58] Field of Search ............... 17/32, 33, 1 F, 45; 426/513, 523

[56] References Cited

U.S. PATENT DOCUMENTS 3,916,483  11/1975  Vinokur ................. 17/1 F X

Primary Examiner—Willie G. Abercrombie
Attorney, Agent, or Firm—Cooper, Dunham, Clark, Griffin & Moran

[57] ABSTRACT

A device and a method for producing skinless sausages by the use of molds are disclosed. The molds comprise individual hollow tubes which are open at both ends. The molds are detachably supported on conveying means and conveyed to a filling device where they are filled with sausage meat. The molds are next brought to a heating device where the sausage meat is heated until the surface is coagulated. The sausage meat at the open ends is allowed to develop freely. The molds are then conveyed to an extraction device where the sausages are extracted from the molds and transported for further treatment. The molds are, in turn, cleaned and returned to the filling device. By means of the use of molds comprising individual tubes which are detachably supported on the conveying means, great flexibility is assured in the process and in the configuration of the machine.

6 Claims, 11 Drawing Figures

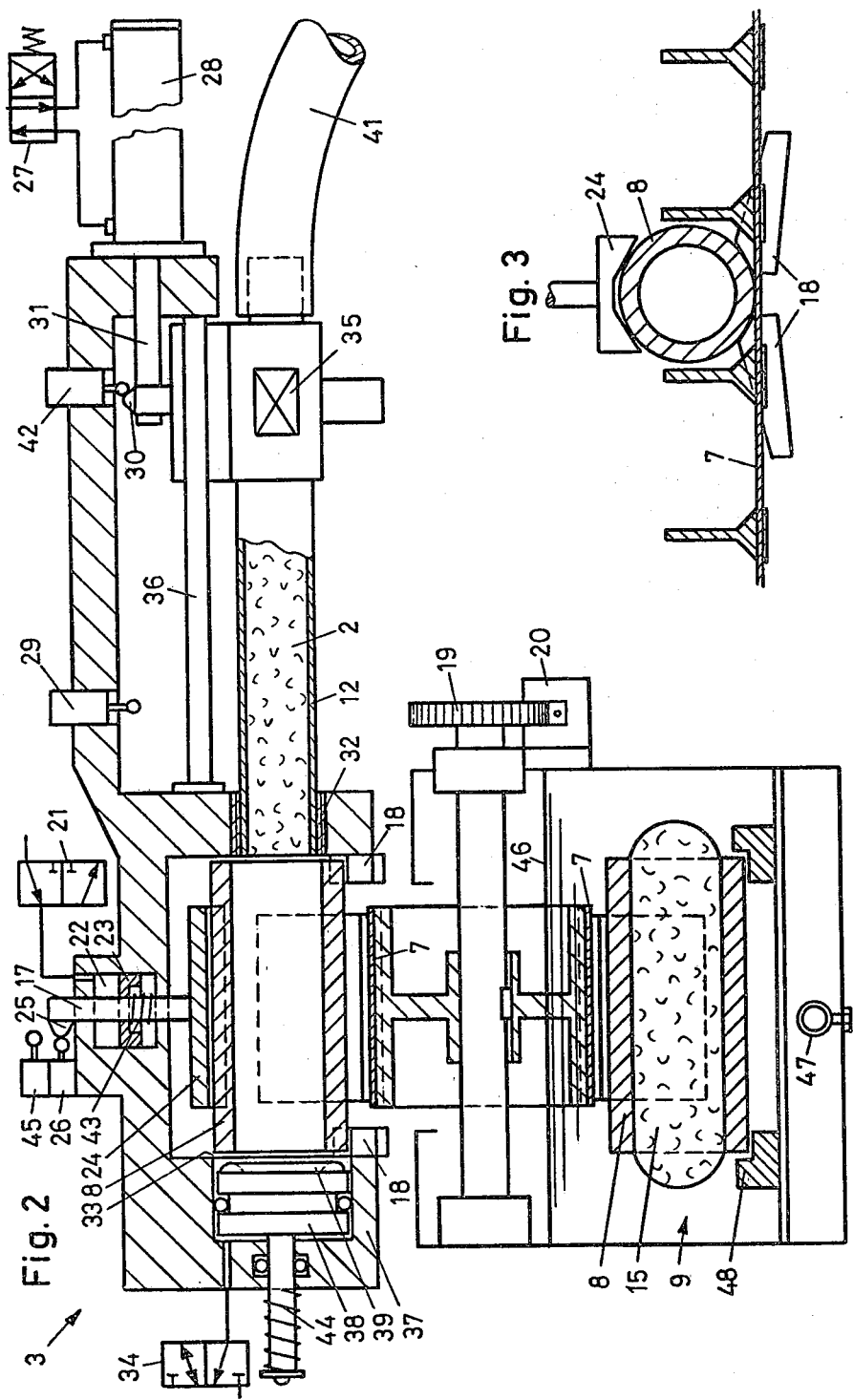

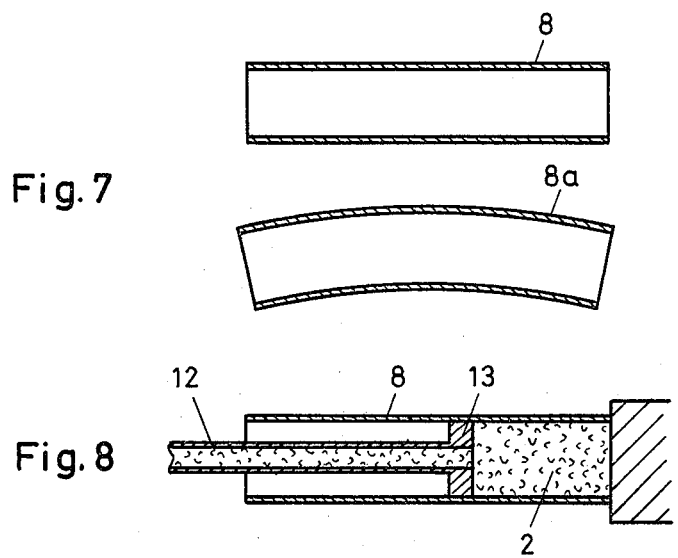
Fig. 7
Fig. 8
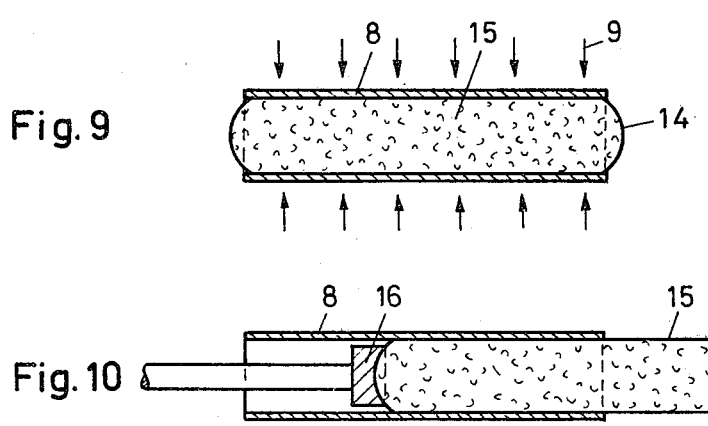
Fig. 9
Fig. 10
Fig. 11
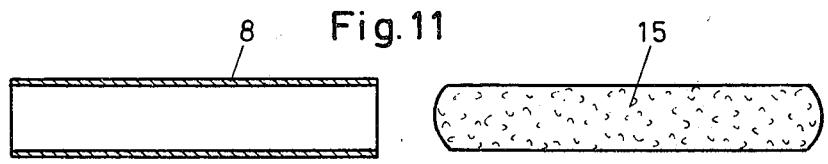

METHOD AND APPARATUS FOR PRODUCING SKINLESS SAUSAGES

BACKGROUND OF THE INVENTION

The present invention relates to a device and a method for producing skinless sausages by the use of molds or forms into which the sausage meat is introduced.

Various methods and machines for the manufacture of skinless sausages are already known. In one such method, described in West German Provisional Pat. No. 1,226,866 and U.S. Pat. No. 2,623,451, the sausage meat is first filled into sausage casings, smoked and boiled, and thereupon the sausage casing is removed. While the disadvantage of the tough sausage casing which is undesirable for eating is eliminated by this method, the other disadvantages still remain, namely the cost of producing the sausage casing, the halts in production due to the limited length of the casing, and the interruptions because of accidential "burstings" of the casing. In addition to this, there is a further expense for equipment and time for the subsequent removal of the sausage casing.

Other known methods operate without such auxiliary sausage casings. Thus, from West German Provisional Pat. No. 1,267,526 it is known to push the sausage meat continuously into or through a forming device in which the meat is coagulated in whole or in part under the action of heat. At the end of the forming device the sausage strand is divided by a cutting apparatus into individual sausages. Due to the required heating time, it is necessary, in order to achieve an economical rate, that the device for producing the sausage be of very large dimensions. Furthermore, upon pushing the sausage meat through the casing, undesirable changes in the meat take place. Furthermore, cutting the previously coagulated sausage strand into individual sections of sausage having straight ends results in a product which is not popular with the consumers.

In another method known from West German Unexamined Application for Patent No. 28 39 772, "skinless" sausages are produced by applying onto the sausage meat a binding agent in order to form an artificial skin. Such sausages, however, do not actually fall within the type with which this invention is concerned.

At an early data, attempts were made to fill the sausage meat into molds and retain them in the molds at least until the coagulation step. In one older method of this type pursuant to U.S. Pat. No. 1,009,953, a hollow cylindrical mold is filled with sausage meat and then sealed at both ends. The mold is then placed for a short time in a hot-water bath so that the outer layer of the sausage can coagulate. The mold is then opened and the skinless sausage ejected. This is a method for purely manual production of sausage. The method is very expensive and not suitable for mass production.

For the industrial production of skinless sausages in larger numbers by means of molds, a machine in accordance with U.S. Pat. No. 1,925,157, for instance, is more suitable. This machine has a molding or forming device which is provided with a plurality of casings arranged in fixed positions. In order to produce the sausage, the forming device is closed at one end and then connected to a filling apparatus. The sausage meat is pushed simultaneously into all the casings thereby producing raw sausages with compacted meat. The forming device is then disconnected from the filling apparatus and opened so that the preformed sausages can be ejected and treated further.

Another similar method using a molding device is known from West German Unexamined Application for Patent No. 25 23 506. A plurality of elongated casings are linked close together to form an endless chain. The casings are provided with removable end closures in order to impart the desired roundness to the ends of the sausages. Furthermore, the casings also have removable caps for the closing of the inlet openings. The casings fastened to the chain are conducted past various treatment stations which contain the following means: means for filling the molds with sausage meat; means for applying the end enclosures; means for applying the caps to the closures; means for cooking and boiling the sausages in the casings; means for removing the caps and closures; means for removing the cooked or boiled sausages from the molds. The molds with their caps and closures are expensive and the method of production is costly.

In U.S. Pat. No. 994,714 a plurality of casings are fastened in radial groups to a wheel, the axes of the tubes being aligned parallel to the axis of the wheel. Upon the stepwise rotation of the wheel, the casings arrive at different stations. In this case also, the sausage which has been introduced into the casings is boiled within the casings. For this purpose, the lower part of the vertically arranged wheel dips into a bath of hot water. The casings employed are closed at both ends.

The machine in accordance with U.S. Pat. No. 2,897,745 is of a type similar to that of U.S. Pat. No. 994,714. The casings are fastened vertically on a horizontal turntable and are heated electrically after filling. For cooking, the casings are closed, the closure pins being pressed under spring action against the ends of the casings. In this way, a uniform constant pressing of the meat is obtained.

All the known methods and machines for the production of skinless sausages which use molds or forms into which the sausage meat is introduced have various disadvantages. Since the molds are arranged in special mold devices, the machines together with the treatment stations must be adapted to these mold devices, which leads to a complicated and expensive construction. The dimensions of the mold devices are set for a given type of sausage and the size of the sausage, as a rule, cannot be easily changed. The rate of production is also substantially determined by the configuration of the machine. Furthermore, it is not possible to replace readily the individual molds in order to produce other types of sausage. Summarizing, it may be stated that the flexibility and degree of freedom of the known methods and machines are very limited.

The object of the present invention is to provide a method for the production of skinless sausages which avoids these disadvantages. By means of the present invention, it will be possible to produce the sausages in a practical and simple manner, with maximum flexibility in the handling of the molds.

SUMMARY OF THE INVENTION

In order to achieve this purpose, a device for producing skinless sausages is provided, comprising a plurality of individual molds, said molds comprising hollow tubes or tube lengths open at at least one end, conveying means to convey said molds sequentially along a predetermined path, said molds detachably supported on said conveying means, filling means to introduce sausage meat into said mold, heating means to coagulate the surface of said sausage meat, and extraction means to extract said coagulated sausage from said molds. A method for producing skinless sausages is also provided comprising introducing sausage meat into individual molds, said molds comprising hollow tubes or tube lengths open at at least one end, heating the molds until the surface of said sausage meat is coagulated, allowing the sausage meat at the open end to develop freely, and extracting the coagulated sausages from the molds.

The individual tubes or tube lengths may be handled in various manners so that great flexibility in the course of the process and in the machine configuration is present. It is possible both to transport the tube lengths continuously in a closed circuit or to stack them in intermediate storage for batchwise operation.

BRIEF DESCRIPTION OF THE DRAWINGS

Various illustrative embodiments of the invention will be explained in further detail below with reference to the drawings, in which:

FIG. 2 is a section along the line II—II through the machine of FIG. 1 in the region of the filling device;

FIG. 3 shows diagrammatically the setting of a tube length;

FIG. 7 shows two different tube lengths which can be used as molds;

FIG. 8 shows the filling of a tube length with sausage meat;

FIG. 9 shows the heating of a filled tube length;

FIG. 10 shows the ejection of the at least partially coagulated sausage; and

FIG. 11 shows the tube length and the ejected sausage.

DETAILED DESCRIPTION

Figure 1:
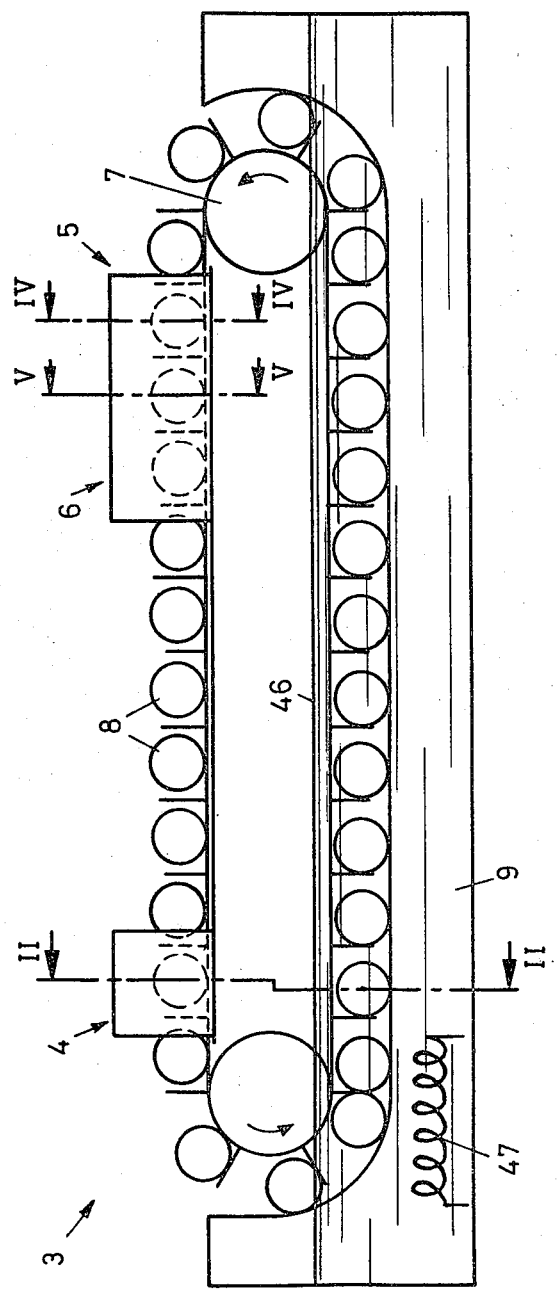
FIG. 1 shows diagrammatically a machine for the production of skinless sausages with the use of loose or detachable tube lengths as molds.
Figure 4:
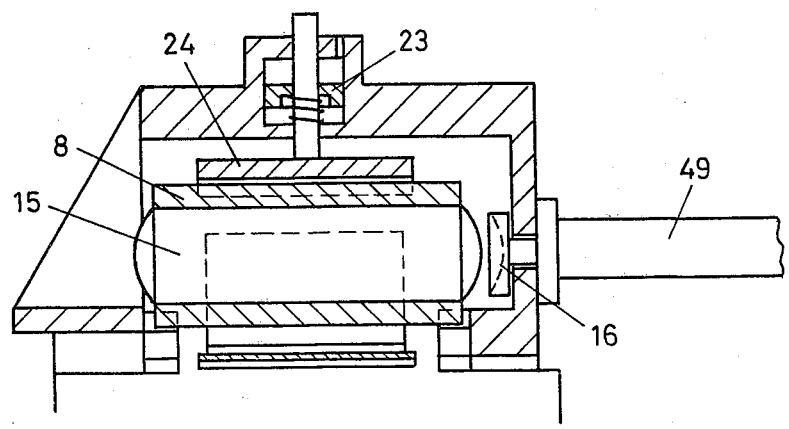
FIG. 4 is a section along the line IV—IV through the machine of FIG. 1 in the region of the mold ejection device.
Figure 5:
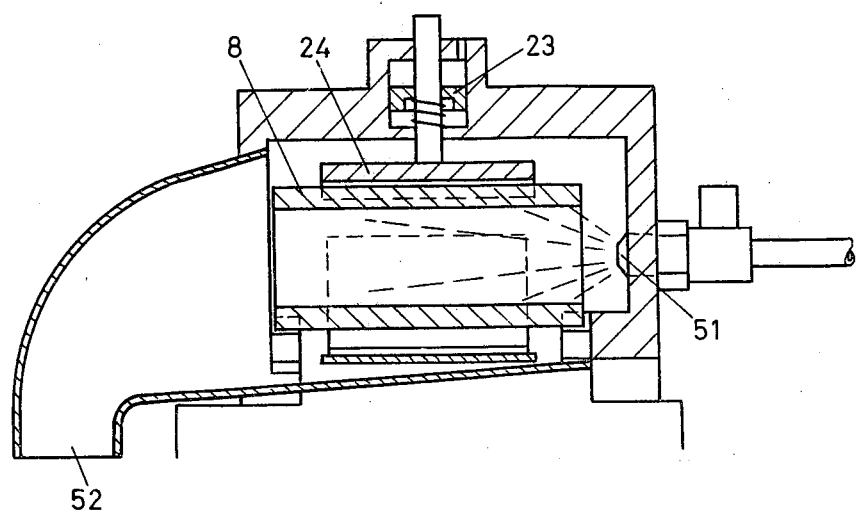
FIG. 5 is a section along the line V—V through the machine of FIG. 1 in the region of the cleaning device.
Figure 6:
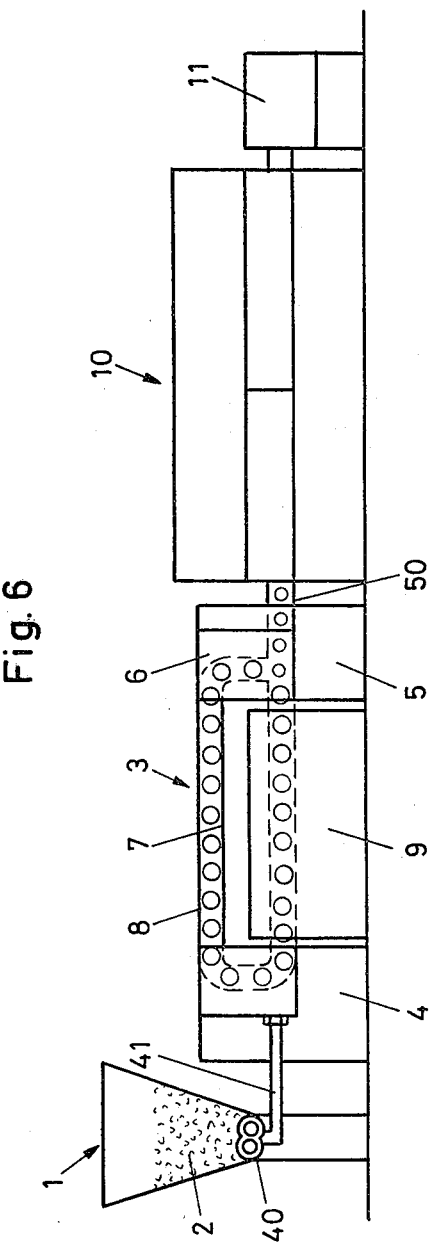
FIG. 6 shows diagrammatically a unit for production of skinless sausages.

The apparatus for the production of skinless sausages shown in FIG. 6 has a filling station 1 into which the sausage meat 2 is fed by a conveyor device, not shown in detail. From the filling station 1, the sausage meat passes to the actual sausage producing machine 3 which comprises the following components: a filling device 4, an extraction device 5, a cleaning device 6, and an endless conveyor device 7 for transporting the filled molds 8 through the heating zone 9 and for returning the empty molds from the cleaning device to the filling station. Behind the machine there is arranged a smoking, boiling and cooling device 10 to which a packing device 11 is connected.

The molds are constructed as straight or bent tube lengths 8 and 8a as shown in FIG. 7. These tube lengths are advantageously made of solid material. The selection of the material depends on the source of heat in which the tube lengths together with the meat mix are heated. If the tube lengths pass, for instance, through a microwave tunnel they must consist of glass or plastic, while if heated by thermal conduction, for instance, they should advantageously consist of metal. The tube lengths are open at both ends and require neither closures, caps, lids or the like. They are handled individually and loosely, which permits them to be used with a great variety of machines. It is also readily possible, if necessary, to replace the straight tube lengths 8 by the curved tube lengths 8a.

In filling tube lengths 8, the meat 2 is not simply pushed into the tube length from the front as in the case of other known methods. Rather it is introduced commencing at the far end with a special filling tube 12 and piston 13, into the tube lengths (FIG. 8).

After filling the tube lengths 8 with the meat mixture 2, the tube lengths are conducted by the conveyor belt 7 to the source of heat 9 and exposed there to the heat whereby the meat is at least partially coagulated. The tube lengths are not closed at their ends when being exposed to the heat. As a result of the heating, particularly of the gaseous components contained in the meat mixture, the meat mixture expands towards the ends. Due to the contact of the surface of the meat against the inner wall of the tube lengths, and due to the partial coagulation which has already taken place on the surface of the meat, a natural rounding of the end surfaces 14 of the resultant sausages is obtained. These sausages thus have a natural shape and meet the expectations of the consumer.

The heating can be so extensive that the entire contents of the tube length coagulate. However, in order to attain a high rate of production and to limit the number of tube lengths to a minimum, it is advisable to keep the heating time as brief as possible. It is therefore sufficient for merely the outermost layer of the meat mix to coagulate since then the form of the sausage becomes established. Thus, for instance, by heating in a water bath at a temperature of 80° C., the meat mixture is shaped into a sausage and can be ejected from the tube length after only 30 seconds without danger of losing its shape in the further course of treatment.

The ejection of the sausage 15 from the tube length 8 can be effected mechanically or by gas pressure or the like. The ejected sausages 15 are transported further, for instance to the smoking, boiling, cooling and packing stations, while the tube lengths are readied and returned to be filled again.

It is advisable to provide the tube lengths 8 with a protective coating on their inner surface in order to avoid any adherence of the sausage meat thereto. The tube lengths can be wetted with a suitable liquid before they are filled or they can also be provided with an anti-adherence coating. In addition to round tube lengths, tubes of triangular, rectangular, ovoid or other cross sections could also be provided.

The actual sausage manufacturing machine 3 will now be described in further detail with reference to FIGS. 1 to 5. The tube lengths 8 are fed by the conveyor belt 7 over the fixing ramp 18 to the filling device 4. The drive is effected by means of a ratchet wheel 19 and a compressed air cylinder 20 which acts on the latter. After the feeding has been effected, the solenoid valve 21 is actuated by a limit switch (not shown) arranged at the end of the stroke of the compressed air cylinder. This is done in a manner so that the inside 22 of the cylinder above the holding-down device 24 is provided with compressed air and the piston 23 presses the holding-down device 24 against the tube length 8 and fixes the latter in position. The piston rod 17 of the holding-down piston 23 bears at its end a projection 25 which acts on a limit switch 26. The latter actuates the valve 27 in such a manner that the piston of the cylinder 28 for the feeding of the meat drives the filling tube 12 into the tube length 8. As soon as the piston is present, the switch 29 is actuated by the projection 30 which is seated on the piston rod 31.

The air in the tube length 8, which is displaced through use of the filling tube 12 provided with a packing 32, escapes through the slot 33 at the opposite end of the tube length 8. The switch 29 controls the valves 27 and 34 and the slide 35. The latter is supported on a guide bar 36 and is moved by the piston rod 31.

The compressed air fed by the pulse valve 34 to the control cylinder 37 presses the sealing surface 39 of the closure piston 38 against the tube length 8 and closes off the air slot 33. The slide 35 now opens the flexible conduit 41 which is connected with the meat delivery pump 40. Since the valve 27 is actuated simultaneously with the switch 29, the piston rod 31 of the cylinder 28 pulls the filling tube 12 back and the meat 2 flows, due to the excess pressure, into the tube length 8. The meat conveyor pump 40 (FIG. 6) holds the meat 2 at a constant pressure. By actuation of the switch 42 upon the return stroke, the slide 35 is closed and the injection of the meat stops. At the same time, the valves 21 and 34 are switched. In this way, pistons 23 and 38 are pushed back by the springs 43 and 44, respectively.

The switch 45 which is actuated upon the pushing back of piston 23 causes the cylinder 20 to operate via a valve and the cylinder advances the conveyor belt 7 by a distance equivalent to the next tube length and begins a new cycle. The filled tube lengths 8 are immersed with the conveyor belt 7 into a liquid 46 which is heated by the heater 47 and held at constant temperature by thermostat control. The tube lengths are held on the conveyor belt 7 in the track by means of the guide 48.

After passage through the bath, the tube lengths are brought to the ejection device 5 where the coagulated sausage 15 is ejected by the cylinder 49 (FIG. 4) which operates in synchronization with the cylinder 28. The ram 16 effects the ejection. The ejected sausage 15 passes by means of another conveyor belt 50 into the smoking chamber 10 for further treatment.

Preparing the tube lengths at the following preparation stations takes place in a manner similar to that which takes place in the filling station and by means of an identical control. The empty tube is rinsed with hot water in the cleaning device 6 by means of the nozzle 51. The waste water discharges via the sewer 52. In a further step, the residual water can be blown out with a similar nozzle. The tube lengths are now ready to be filled again.

The method of producing skinless sausages which has been described above and the apparatus for carrying out this method have many advantages:

The individual tube lengths are very simple parts which can be manufactured in a practical and economical fashion.

These tube lengths can be used with all machines which are designed for the handling of removable tube lengths.

The replacement of some or all of the tube lengths can be done readily at any time.

The tube lengths are easy to handle. For example, the individual tubes are easily handled when being coated with an anti-adherence coating, or when the coating is renewed, particularly when the coating is cured.

By the use of individual tube lengths, the designer is assured great freedom in the arrangement of the individual components of the machine. These components can be designed in a modular system and combined with each other in different manners.

The use of individual tube lengths is particularly suitable for high-output machines with high operating rate. In the same way as in bottle-filling machines which can handle individually 50,000 or more bottles per hour, the tube lengths can also be handled individually in large numbers.

In addition to continuous operation in a closed circuit, batchwise storage operation is also possible. Thus, for instance, a magazine for the stacking of the tube lengths can be arranged in front of the filling station. Upon the completion of treatment or the detachment of the tube lengths, all tube lengths can be arranged in the magazine. The "storage" principle permits the shutting down of individual working stations without having to stop the entire plant.

In another plant (not shown in detail) for the production of skinless sausages in large numbers, a continuously rotating filling drum can be provided as a filling station. The tube lengths are distributed uniformly about the circumference of the drum and held, pneumatically or hydraulically, parallel to the axis of the drum.

After the tube lengths are filled, they are transferred to a conveyor device which conducts them, through a microwave oven, for heating. At the other end of the conveyor device there is an extraction and cleaning drum which removes the filled tube lengths. After the ejection of the sausages by rams, the cleaned tube lengths are transported back again to the filling drum.

In another system which is a combination of the two preceding ones, several units for operation (for instance, meat filling tubes) are arranged on a carriage which accompanies the continuously driven tube length conveyor device to carry out its operation (for instance, filling the tube lengths) and returns to its initial position after its job is complete. Despite stepwise operation, this system results in a continuous high-output production.

I claim:

1. Apparatus for producing skinless sausages, comprising:
   a. a plurality of individual molds;
   b. conveying means to convey said molds sequentially along a predetermined path;
   c. filling means to introduce sausage meat into said molds;
   d. heating means to coagulate the surface of said sausage meat in the molds; and
   e. means to extract the surface-coagulated sausages from said molds; wherein the improvement comprises:
   f. said molds comprise hollow tubes open at least at one end, and are loosely supported on the conveying means;
   g. means at a filling station along said path for releasably gripping a mold to hold it against movement relative to said conveying means;
   h. said filling means including:
      1. a filling tube insertable into a gripped mold through an open end thereof;
      2. means for reciprocating the filling tube into and out of said gripped mold; and 3. means for supplying ground sausage meat under pressure to said filling tube during reciprocation thereof; and
i. means effective after movement of the filling tube out of the gripped mold to release said gripping means;
j. said heating means being effective to expand the meat through the open ends of the molds and to coagulate the surfaces of the meat at the open ends of the molds.

2. Apparatus in claim 1, wherein:
a. said mold comprise hollow tubes at both ends; and
b. said filling means comprises:
   1. means effective during insertion of the filling tube into one end of a mold tube to vent the opposite end of that mold tube;
   2. means effective during movement of the filling tube out of the mold tube to close the vent so that the mold tube is filled by the sausage meat supplying means; and
   3. means for opening said opposite ends of the mold tube after the mold tube is filled and before it is moved to the heating means.

3. Apparatus as in claim 1, wherein said molds comprise curved hollow tubes.

4. A method of producing skinless sausages, comprising:
a. introducing sausage meat into a plurality of individual molds;
b. heating the molds until the surface of the sausage meat is coagulated; and
c. extracting the surface-coagulated sausages from the molds;
wherein the improvement comprises:
d. said molds are hollow tubes having at least one end open during said heating, so that the sausage meat is free to expand at said open ends and coagulates at its expanded end surfaces.

5. A method as in claim 4 wherein said hollow tubes are open at both ends and the sausage meat is allowed to expand freely at both open ends during heating.

6. A method as in claim 4, wherein said sausage meat is introduced into said molds by inserting a filling tube into each said mold and introducing sausage meat into said mold through the filling tube as the filling tube is withdrawn therefrom.

* * * * *